Aug. 19, 1947.　　　　J. W. ING　　　　2,425,806
ATTACHMENT FOR TRACTORS
Filed Sept. 24, 1943　　　3 Sheets—Sheet 2

Inventor
John W. Ing
By Parker, Carlson,
Pitzner & Hulford
Attorneys.

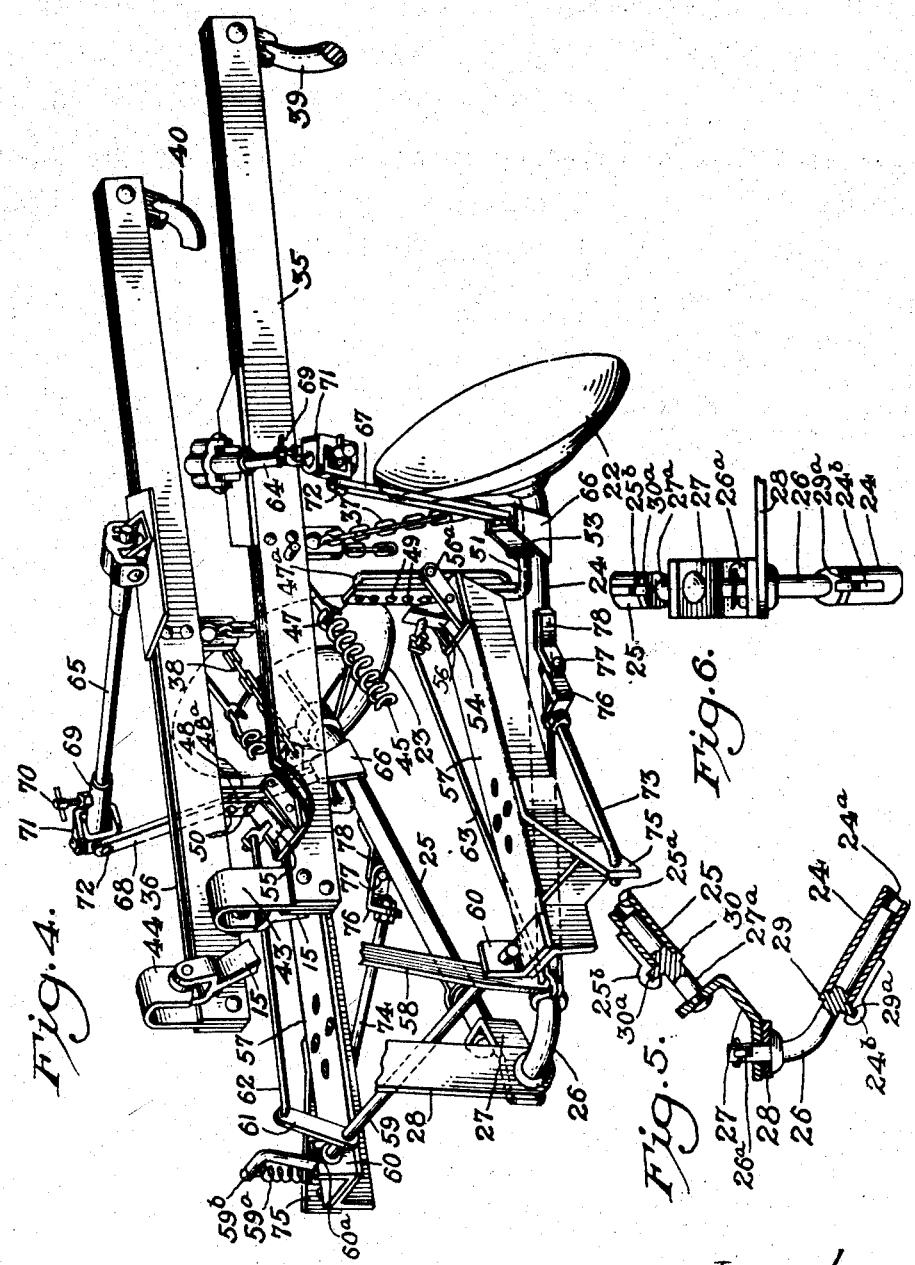

Patented Aug. 19, 1947

2,425,806

UNITED STATES PATENT OFFICE 2,425,806

ATTACHMENT FOR TRACTORS

John W. Ing, Longview, Tex., assignor to G. A. Kelly Plow Company, Longview, Tex., a corporation of Texas Application September 24, 1943, Serial No. 503,592

12 Claims. (Cl. 97—47)

The present invention pertains to improvements in attachments or implements for tractors and particularly for tractors equipped with a power lift device.

One general object of the invention is to provide such an apparatus embodying a plurality of independently elevatable elements, such, for example, as plow disks or other tillage devices, so arranged that although they are connected to the power lift for movement in unison thereby, they can be selectively and individually restrained against such movement by manipulation of a simple control whereby the operator is afforded full selective control of the use of the several elements.

More specifically, it is an object of the present invention to provide a two-way plow or the like adapted for use on a tractor having a power actuated lift, the implement being so constructed that the power lift may be utilized to raise both cutters of the plow whereupon either desired one of them may be latched in its inoperative raised position and the other left free for descent into ground-engaging position upon subsequent release of the power lift.

A further object is to provide a two-way plow or the like for attachment to a tractor having a power unit thereon and adapted to use the power unit for both power lifting and automatic draft control of either selected one of the two cutters of the plow, the selection being capable of accomplishment through merely the manipulation of a simple latching arrangement.

Still another object is to provide a two-way plow or the like in which provision is made for not only utilizing a power lift on the tractor to modify the contour-following action of the apparatus in a manner to regulate the draft, but for also utilizing the power lift in the selectively controllable shift of alternately available plow elements or the like from elevated transport position into lowered working position.

The invention also resides in various structural improvements and arrangements of the parts by which simplicity and ruggedness of construction are correlated with versatility of control and operation.

Further objects and advantages of the invention will become apparent as the following description proceeds, taken in connection with the accompanying drawings, in which:

Fig. 4 is a perspective view of the implement attachment or two-way plow shown in Fig. 1, certain of the parts being broken away for clarity of illustration.

Fig. 5 is an enlarged fragmentary detail view, partially in section, of the thrust connections at the rear ends of the pusher bars.

Fig. 6 is a fragmentary rear view of the parts shown in Fig. 5.

Figure 3:
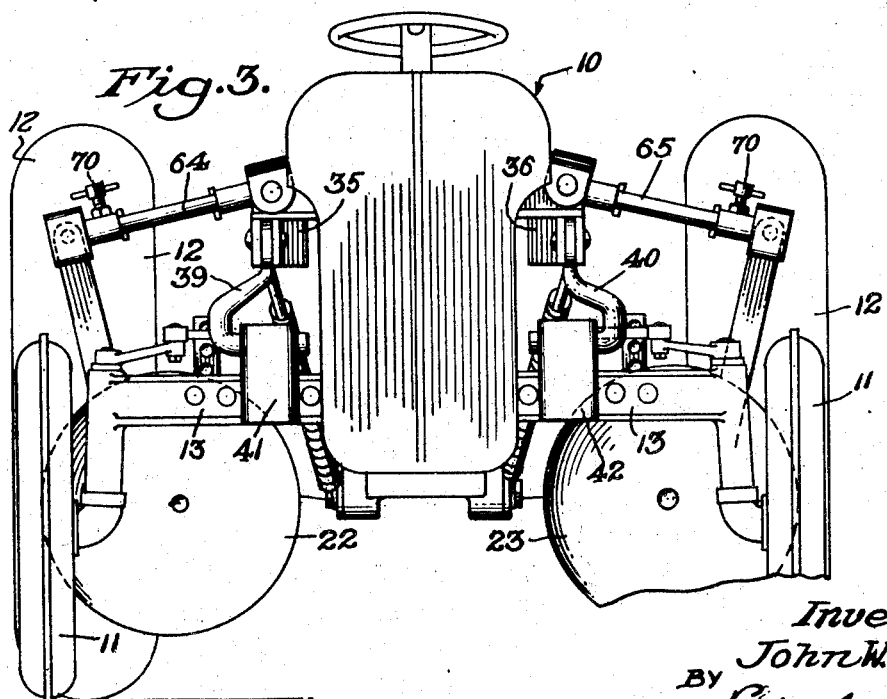

Referring more particularly to the drawings, the invention has been exemplified therein as embodied in a two-way plow attachment for a tractor designated generally as 10. The tractor itself may, of course, take a variety of forms and has been illustrated simply as being one of well-known commercial design. For present purposes it may be observed that it is provided with front and rear wheels 11, 12, the former being carried on front axle extensions 13 (see Fig. 3) which displace the front wheels laterally somewhat more than usual to accommodate the implement herein shown.

On the upper rear portion of the tractor, immediately behind the driver's seat 14, is a power operated lift means comprising a pair of arms 15 fixed to a transverse shaft 16 and adapted to swing in unison in a limited arc about the center of the shaft. The construction and operation of this and similar power units is well-known in the art and, of course, such unit may take a variety of forms. Simply for purposes of exemplification, that here shown is substantially the same as that disclosed in Ferguson Patent No. 2,118,180, issued May 24, 1938, and accordingly detailing here is unnecessary. For the present suffice it to say that a hydraulic ram (not shown) is adapted to swing the arms 15 upward, the same being returned as hereinafter described. Supply of pressure fluid to the ram to raise the arms 15 may be controlled either manually by a lever 17 or by automatic actuation of a valve-operating plunger or reversing control member 18. Such plunger is biased outward by a compression spring 19 and is pivotally connected at its outer end to the center point of a rigidly joined pair of bell cranks 20 which are pivoted at 21 on the rear end of the tractor to swing fore and aft. Thrusting the plunger 18 inward causes pressure fluid to be admitted to the ram to elevate the arms 15 to the position shown in Fig. 1; conversely, outward motion of the plunger 18 causes fluid to be bled from the ram to permit descent of the arms 15 from the position shown in Fig. 1.

It is for use with such a tractor as that indicated above that the presently disclosed implement has been designed, although obviously enough it may be accommodated to other specific forms of tractors without departing from the present invention. Accordingly, the intention is to cover all modifications, adaptations and alternative constructions falling within the spirit and scope of the invention as expressed in the appended claims.

Turning now to the implement itself, it has been illustrated as a disk type plow suited for either terracing or breaking. Two ground engaging cutters, shown as plow disks 22, 23, are employed. They are disposed on opposite sides of the central portion of the tractor, facing generally forwardly and outwardly. As will hereinafter appear, the power unit on the tractor may be used to lift both disks to an inoperative transport position; through the manipulation of a simple selector arrangement either of the two disks may be disabled from lowering into working position upon subsequent descent of the power unit arms 15; and the power unit serves during operation of the outfit to regulate automatically the draft load on the selected one of the two disks which is then in operation.

The disks 22, 23 are freely journaled on the forward ends of respective ones of a pair of pusher bars 24 and 25. These bars extend from the rear end of the tractor forward and outward, diverging away from each other in a V (see Fig. 4). The disks 22, 23 are set with their axes canted at a small angle relative to the longitudinal axes of their respective pusher bars so that the angle of entry of the disks into the ground can be adjusted by a simple rotational adjustment of the corresponding pusher bars about their respective longitudinal axes. Such change in the entry angle of the disks varies the distance that they throw the displaced soil outward, a type of control which is especially desirable in building terraces.

Thrust is transmitted from the tractor to the pusher bars 24, 25 through a linkage next to be described. This linkage is such as to permit limited fore and aft, as well as vertical, motion of the rear ends of the pusher bars, such motion of the bars incident to the reaction of the ground against the working one of the disks being transmitted to the valve operating plunger 18 to effect automatic draft control. In the illustrative construction, the rear ends of the pusher bars 24, 25 are socketed on the respective ends of thrust members 26, 27, each of the latter being pivoted for individual vertical motion on the lower end of an upstanding link 28. The member 26 (see Fig. 4) comprises a curved bar, the forward end of which is received within a bore 24a in the rear end of the pusher bar 24. A collar 29 is rigid with the member 26 and has a flange 29a thereon of an arcuate length somewhat greater than the maximum range of angular adjustment of the pusher bar 24. A finger 24b rigid with the pusher bar is hooked over this flange 29a and holds the pusher bar 24 against endwise displacement with respect to the thrust member 26. To disengage the finger 24b from the flange 29a, the linch pin 26a is removed from the rear end of pusher 26, and the latter is then disengaged from the link 28 and turned to free parts 24b and 29a for dismounting of the pusher bar. The other thrust member 27 comprises an L-shaped bracket having a projection 27a on its forward end similarly received in a bore 25a in the rear end of its pusher bar 25 and a finger 25b on this pusher bar is hooked over a segmental flange 30a on collar 30 rigid with the projection to hold the pusher bar 25 in place (see Figs. 5 and 6).

The upright link 28, to which the thrust members 26, 27 are pivoted as noted above, is arranged for limited vertical as well as fore and aft motion. For this purpose the link 28 is pivoted intermediate its ends at 31 on a swinging bail structure comprising a pair of curved links 32 arranged to embrace the differential housing on the rear end of the tractor and pivoted thereto at 33. At its upper end the link 28 is pivotally connected by a pin 34 to the projecting rear ends of the bell cranks 20.

In the operation of the linkage just described, it will be observed that as the tractor advances, either of the disks 22, 23 which may be in lowered or working position is pushed forward through the ground by the thrust transmitted from the tractor through the bail 32, link 28, and thrust member 26 or 27 to the corresponding pusher bar. As the disk advances its engagement with the soil causes it to revolve in an inboard direction. The reaction of the ground against the working disk is transmitted through its pusher bar to the link 28, tending to swing the upper end of such link in a forward direction. Such motion is, however, resisted by the compression spring 19. By suitable choice of spring the reversing control member or valve plunger 18 is retained in its neutral position so long as the load on the disk is of a corresponding predetermined value. Increase in the load on the disk beyond such value causes the spring 19 to be compressed still further, thus thrusting the plunger 18 forward into position for effecting raising of the arms 15. The disk is raised by such arms, through a connection hereinafter described, thus decreasing the depth of soil penetration and diminishing the load to the predetermined value, whereupon the plunger 18 goes back to its neutral position. Conversely, as soil conditions change so that the load on the disk diminishes below its predetermined minimum value, the resultant expansion of the spring 19 will push the plunger 18 outward, thus causing the arms 15 to move in a lowering direction for increasing the depth of penetration. In this manner a substantially uniform load on either of the disks which happens to be working is maintained automatically.

The action of the draft control arrangement just described is, in effect, used to modify or modulate the basic rise and fall action of the supporting arrangement for the disks 22, 23, the latter being such as to cause them to follow the contour of the land as detected by the corresponding front wheel 11 of the tractor. Correlated with such dual or modified depth control for each of the disks is an arrangement for selectively disabling one disk or the other against operation but without interfering with the rather complex control action for the operation of the other disk and still making it possible to alternate disks with extreme rapidity and simplicity of manipulation. Complete understanding of the interaction and interrelation of the various controls and adjustments will best be had after detailing of the particular exemplary construction shown in the drawings.

As herein shown, each of the pusher bars 24, 25 and its plow disk 22, 23 is suspended from a corresponding lifting beam 35, 36 by what may be termed one-way lifting connections, here shown as chains 37, 38. As will be evident, the term "one-way lifting connection" indicates that force is transmitted from the lifting beam through the connection in only one direction, namely, upward, the descent of the suspended disks and pusher bars being effected by gravity upon the permissive lowering of the lifting beams. These beams 35, 36 extend alongside the body of the tractor and are supported at their forward ends on the fore portion of the tractor. Thus, the forward end of each of the beams 35, 36 is pivoted to the upper end of a corresponding one of arms 39, 40, the latter being pivoted at their lower ends on brackets 41, 42 to swing fore and aft. The brackets are, in the present instance, fixed to the front axle extensions 13. Thus as each front wheel rises or falls in following the contour of the land, the corresponding beam 35, 36 also rises and falls, carrying with it the associated plow disk which is depending from the beam by its chain in lowered working position. Mounting the front wheels 11 laterally spaced from the center line of the tractor as shown positions them to run in the previously plowed furrow.

The rear ends of the lifting beams 35, 36 are pivotally connected by brackets 43, 44 to respective ones of the lifter arms 15, the beams being positioned generally horizontally through proper dimensioning of the arms 39, 40, with relation to the arms 15. As the arms 15 are raised or lowered they correspondingly raise and lower the beams 35, 36 in unison. In this connection it is to be noted that raising and lowering of the arms 15 entails an incidental fore and aft motion of the same. Mounting of the forward ends of the beams on the links 39, 40 not only accommodates the fore and aft motion of the beams incident to swinging of the arms 15, but does it with such complete freedom as to obviate any tendency to twist the front axle of the tractor.

Figure 1:
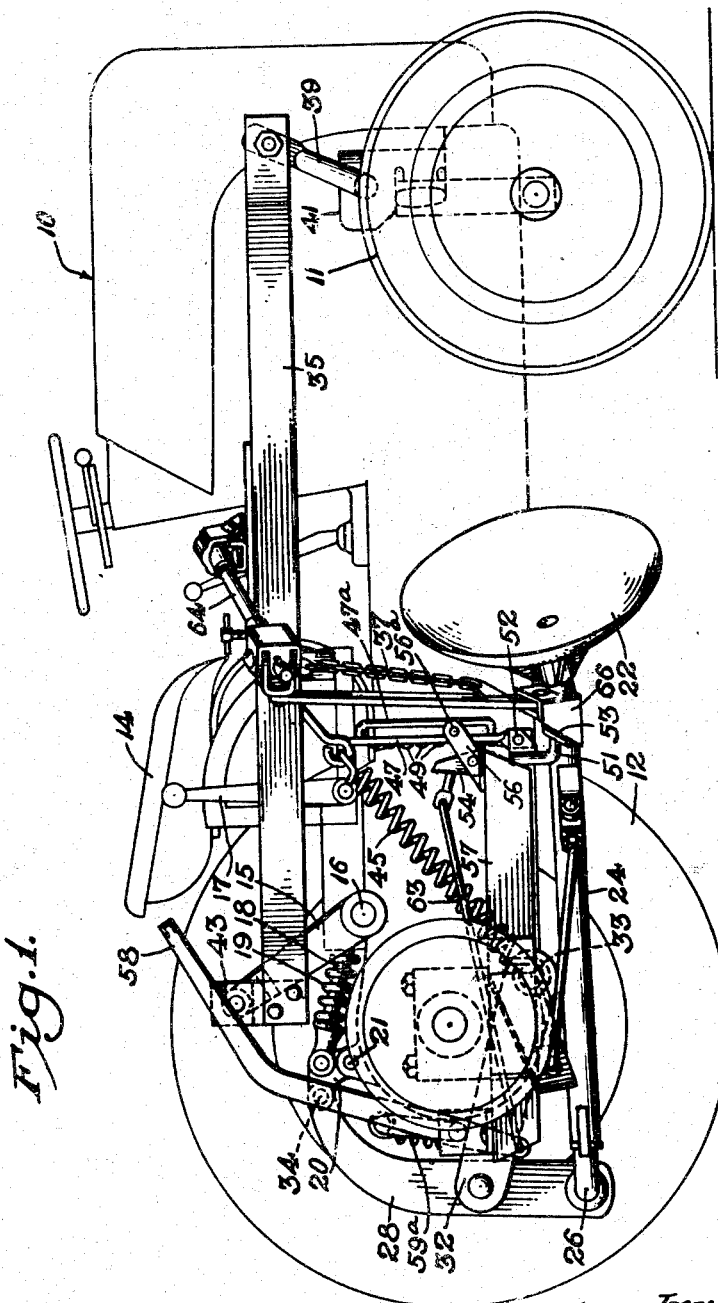
Figure 1 is a side elevation, partly in section, of a tractor equipped with a two-way plow embodying the present invention, the plow being shown in transport position.
Figure 2:
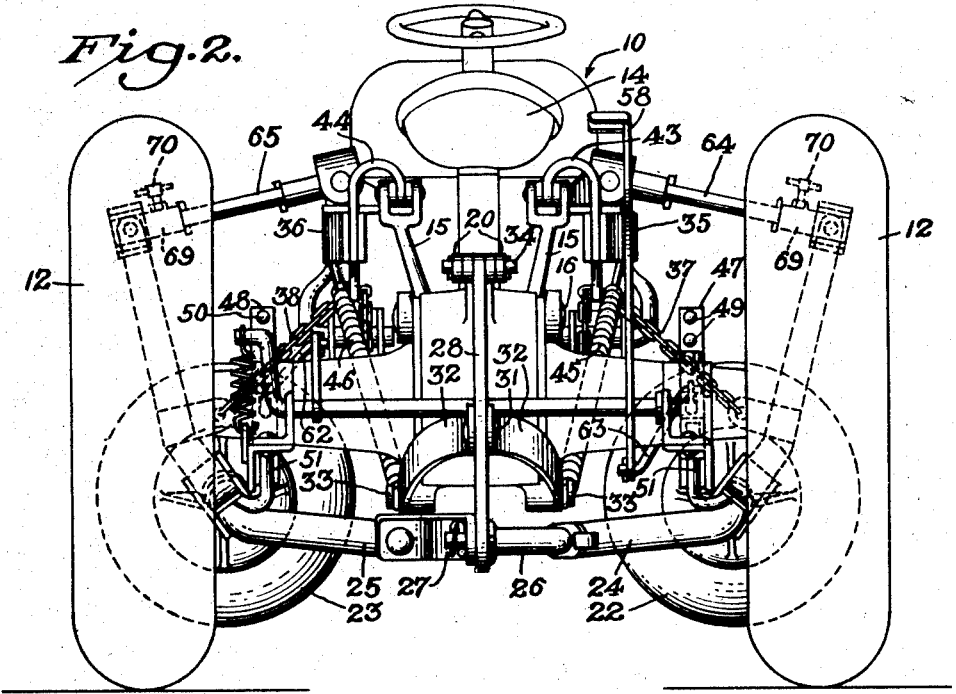
Figs. 2 and 3 are, respectively, front and rear end views of the apparatus of Fig. 1.

To augment the weight of the implement in biasing the lifter arms 15 in a downward direction, one or both of the tension springs 45, 46 shown may be connected between respective ones of the lifting beams 35, 36 and the body of the tractor (see Figs. 1 and 2).

Disabling of a desired one or other of the plow disks 22, 23 is accomplished by releasably latching it in an inoperative elevated position. For that purpose each of the pusher bars 24, 25 has upstanding therefrom a corresponding bar 47, 48 presenting vertically spaced ratchet or latch teeth 49, 50. Connection from the upright bars 47, 48 to the corresponding pusher bars 24, 25 is afforded through L-shaped rods 51 pivotally connected at their upper ends to the upright bars as indicated at 52 and with their lower ends rotatably received within sockets 53 on the pusher bars. By virtue of this connection freedom of adjustment for the pusher bars is afforded without interfering with the vertical position of the upright bars 47, 48. Coacting with the series of ratchet teeth 49, 50 are respective locking pawls 54, 55. The pawls are channel-shaped in cross section, being pivoted on brackets 56 fixed to the forward ends of beams 57 bolted to the rear axle housing of the tractor and constituting a supporting sub-frame.

Guiding of the upright latch members 47, 48 for vertical movement is afforded by pins 56a fixed on the forward ends of the brackets 56 and projecting into slots defined by the forward faces of the members 47, 48 and guide rods 47a, 48a fixed to them.

Swinging of the pawls 54, 55 alternately into and out of position for engagement with the respective series of ratchet teeth 49, 50 is accomplished through the manipulation of an operating handle 58 that extends upwardly into convenient position relative to a driver seated at 14. This operating handle is fixed to a transverse operating shaft 59 journaled in brackets 60 fixed to the rear ends of the sub-frame beams 57. A crank arm 61 fixed to the shaft 59 is connected by a pivoted rod 62 with the pawl 55, while the extended lower end of the lever 58 constitutes a similar but oppositely extending crank arm which is connected by a pivoted rod 63 with the other pawl 54. An over-center spring 59a connected to an arm 59b rigid with the shaft 59 and to one of the beams 57 yieldably biases the shaft 59 to either of the alternately available operating positions to which it may be oscillated. With the operating handle 58 positioned as shown in Figs. 1 and 4 the pawl 54 is disengaged and the pawl 55 engaged. To alternate such engagement it is necessary merely to swing the handle 58 rearward a short distance, whereupon the pawl 55 is pulled rearwardly into disengaged position and the pawl 54 thrust forward into engaging position.

The left end of the transverse shaft 59 (see Fig. 4) is received in a slot 60a in the left bracket 60, while the right end is received in a round hole of the right bracket 60. To remove the shaft 59 it is necessary simply to disconnect rods 62, 63, then unhook the spring 59a and lift out the shaft.

In using the selective locking mechanism described above, the operator throws the lift control lever 17 to raise the arms 15, whereupon the lifter beams 35, 36 pull both of the disks 22, 23 upward into the inoperative or transport position shown in the drawings. If the operator wishes to retain, say the disk 23 elevated, and to use the other disk 22 for plowing, he positions the selector lever 58 as shown in Fig. 1. This shifting of the lever 58 engages the pawl 55 and disengages the pawl 54. Should an inexperienced operator shift the lever 58 as described, before the disks have been raised, no damage is done since the pawl 55 will simply ratchet over the teeth 50 during the lifting operation.

To lower the selected disk into working position he has only to throw the lever 17 into lowering position. Thereupon the lifter arms 15 will descend into working position determined by the setting of the lever 17, carrying with them both of the beams 35, 36. However, only the selected disk 22 will descend with its lifter beam, the other disk 23 being positively locked by the engaged pawl 55 and thus held in elevated position despite the lowering of the beam 36. Conversely, if the operator wishes to retain the disk 22 elevated and to lower the disk 23 into working position, he carries out the same series of operations with the exception that the selector lever 58 is thrown to disengage the pawl 55 and to engage the pawl 54. It will thus be seen that by means of this simple selective latching arrangement it is possible to select one disk or the other at will and without physically interrupting the connection from either of the disks to the lifter mechanism although that for the locked disk is in effect temporarily disabled.

Provision has also been made for rotatively adjusting the pusher bars 24, 25 to change the angle of entry of the disks 22, 23 individually for the purpose heretofore indicated but in a manner which will not interfere with the selective lowering of the disks. For this purpose arms 64, 65 are arranged to project laterally from the respective lifting beams 35, 36, being pivotally connected thereto at their inner ends. Fixed to the pusher bars 24, 25 by brackets 66 are upwardly projecting struts or links 67, 68 whose upper ends are connected to the respective arms 64, 65 by adjustably positionable pivotal connections. As to the particular form of connection shown, sleeves 69 are telescoped on the arms 64, 65, being releasably clamped at any desired position along the length of the latter by clamp screws 70. Fixed to each of the sleeves 69 is a clevis 71 to which the upper ends of the struts 67, 68 are pivoted by pins 72. By releasing one of the clamps 70 and sliding its sleeve 69 along the corresponding arm 64 or 65, the associated strut 67 or 68 is swung inward or outward as the case may be, thereby changing the included angle between it and its arm and thus rotatively adjusting the pusher bar 24 or 25 to which such strut is rigidly connected. A simple and easy adjustment of the entry angles for the individual disks 22 and 23 is thus afforded. On the other hand, the pivotal connection between the struts 67, 68 and the corresponding arms 64, 65 makes it possible for them to move toward each other upon lowering of the lifting beams 35, 36, when one of the pusher bars is latched in its raised position, without interfering with such lowering of the beams.

Lateral movement of the pusher bars 24, 25 is prevented by struts 73, 74 fixed at their outer ends to brackets 75 rigid with the sub-frame beams 57 and having their inner ends adjustably threaded in tapped holes in L-shaped members 76 pivoted at 77 on brackets 78 fixed to the respective pusher bars (Fig. 4). The pivots 77 permit movement of the pusher bars requisite to rotational adjustment of the same in changing the disk angle while still enabling the struts 73, 74 to restrain the bars against lateral displacement under load.

The operation of the apparatus will, in general, be apparent from the foregoing. By way of brief résumé, it may be observed that in going to or from the site of use the operator, through manipulation of the control lever 17, raises the arms 15, thereby elevationg the disks 22, 23 to the transport position. Upon arrival at the point of use, the implement is readied for operation by checking to see that the desired pusher bar is latched at the selected elevation and the other free to descend; should alternation of the latching be required, all that is necessary is shift of the selector handle 58. To begin plowing the operator shifts the lever 17 to its lowering position, whereupon the arms 15 are permitted to swing down a desired distance. This lowers both beams 35, 36 of the lifting frame in unison. The unlatched one of the pusher bars also descends, the other one remaining latched in its elevated position. In this way the selected disk is brought into ground engagement and plowing instituted without necessity for even interrupting the forward progress of the tractor.

Should a change in entry angle of the active disk be desired the clamping screw 70 for its strut 67 or 68 is loosened and the strut swung inboard or outboard as the case may be to achieve the necessary angular adjustment of the associated pusher bar and its disk.

As the plowing progresses, the forward end of the lifting beam 35 or 36 for the disk which is working rises and falls with the adjacent one of the front wheels 11 for the tractor, causing the disk to be raised or lowered to follw accurately the contour of the ground. The vertical position of the lifter beams, so controlled for contour, is, however, modified automatically as occasion may demand to maintain a substantially constant draft load by proportionate variation of depth of penetration of the disk into the soil. For that purpose the thrust on whichever one of the pusher bars 24, 25 that is working is transmitted by the link 28 to the spring-urged control plunger 18 of the power lift device, all as heretofore detailed.

Upon reaching the end of a furrow, or at any other time when it may be desired, the disks 22, 23 may be alternated. For that purpose the lever 17 is shifted to cause the lifter arms 15 to raise both disks to a height at which it is desired to carry one of them. Subsequently, the selector lever 58 is thrown to reverse the latching condition, and the lever 17 again shifted to lower the arms 15. Thereupon the other of the plow disks, being unlatched, will descend into working position and plowing proceeds as before but with such other disk.

Should it be desired to lower both disks to the ground while the tractor is at rest, the lever 58 can be swung to its mid position, freeing both latches for simultaneous descent of the two disks.

Although the disks can, in the manner described, be conditioned alternately for plowing, it will be observed that each is fully and independently adjustable and without interference with or change in such adjustment when a selected one of the disks is cut out of service. All control and adjustment connections to and from both disks remain intact irrespective of which disk is conditioned for operation, nor is the manipulation of the simple selector set-up interfered with by such connections.

I claim as my invention:

1. In a two-way plow attachment for a tractor having a power actuated lift means thereon, the combination of a pair of lifting beams, means for pivotally supporting the forward ends of said beams on the fore portion of the tractor with the beams extending generally horizontally alongside the body of the tractor at opposite sides thereof, means for connecting the rear portions of said beams to the lifting device on the tractor for unison vertical movement thereby, a pair of pusher bars having plow disks on their forward ends, means for pivotally supporting the rear ends of said bars on the rear portion of the tractor with the bars projecting generally forwardly beneath respective ones of said beams, flexible suspension means for suspending the fore portions of the pusher bars from the respective beams for elevation by the beams upon raising of the latter by the lifting device, and selectively operable means for locking alternate ones of said bars in elevated position.

2. In a two-way plow attachment for a tractor having a power lift thereon comprising a pair of swinging arms spaced from each other laterally of the tractor and pivoted on a horizontal axis on the rear portion of the tractor to swing vertically and fore and aft of the same, the combination of a pair of lifting beams dimensioned to extend along opposite sides of the tractor and having means thereon for pivotally connecting their rear end portions to respective ones of the lifter arms, generally upright links pivotally connected at their upper ends to the forward ends of the beams and adapted to be pivotally connected at their lower ends to the fore portion of the tractor, said links being of a height to position the beams substantially horizontally and serving to accommodate, without imposing torsion on the portion of the tractor to which such links are pivoted, the fore and aft motion of the beams incident to swinging of the lifter arms in raising and lowering the beams, and a pair of tillage members supported by respective ones of said beams.

3. In an implement for a tractor having a power actuated lifting means thereon, the combination of a lifting frame adapted to be movably mounted on the tractor and connected to the lifting means for vertical movement thereby, a pair of plow disks, means for suspending said disks from the lifting frame on opposite sides of the body of the tractor, the last-mentioned means including individually rotatable means for each disk for adjusting the angle of entry thereof into the ground, means for selectively locking said disks in the elevated position to which they are brought by a rise of the lifting frame, arms fixed to project laterally outward from opposite sides of said frame, struts fixed to said adjusting means and extending upwardly therefrom to corresponding ones of said arms, and means forming pivotal connections between said struts and the corresponding arms at selectively variable points along the lengths of the latter, a change in the location of each of said pivotal connections along its arm serving to change the included angle between such strut and arm and thereby the angular adjustment of said adjusting means, the pivotal character of such connections permitting not only such change in included angle but also precluding interference by the strut and arm with lowering of the supporting frame when one of the disks is locked in elevated position.

4. In an implement attachment for a tractor having a power actuated lift device, the combination of a sub-frame including a pair of beams adapted to be rigidly fixed to the rear axle housing of the tractor and project forwardly on opposite sides of the tractor body, a pair of implement supports, means for suspending said implement supports from the lift device on opposite sides of the tractor, said supports having uprights thereon each presenting a series of ratchet teeth and projecting upward adjacent said beams, a pair of pawls pivoted on respective ones of said beams for engagement with the teeth on corresponding ones on said uprights upon elevation of the latter by raising of the supports by the lift device, an operating shaft extending transversely between said beams, and means for actuating said pawls alternately into and out of position for operative engagement with the teeth on their corresponding uprights in response to oscillation of said shaft in corresponding opposite directions.

5. In a two-way plow attachment for a tractor, the combination of a pair of pusher bars having disks on their forward ends canted with respect to the longitudinal axes of their respective bars, thrust means engaging the rear ends of said bars and journaling the same for rotational adjustment about their longitudinal axes and with the bars positioned to extend forwardly and outwardly away from each other in a V, means for supporting said thrust means pivotally on the rear portion of the tractor for individual vertical swinging motion of the bars upon pivoting of the thrust means and with the V located generally beneath the tractor, and means for rotatively adjusting said bars individually about their respective axes to change the angle of entry into the ground of the canted disks thereon.

6. In an implement for a tractor having a power actuated lifting means thereon, the combination of a pair of lifting beams, means for pivotally supporting the forward ends of said beams on the fore portion of the tractor with the beams extending generally horizontally alongside the tractor body, means for connecting the rear portions of said beams to the lifting device on the tractor for unison vertical movement thereby, a pair of plow disks, means for suspending said disks from the intermediate portions of respective ones of said beams, means for effecting individual rotative adjustment of said disks for adjusting the angle of entry thereof into the ground, means for selectively locking said disks in the elevated position to which they are brought by the rise of said beams, arms fixed to project laterally outward from opposite sides of said frame, struts fixed to said adjusting means and extending upwardly therefrom to corresponding ones of said arms, and means forming pivotal connections between said struts and the corresponding arms at selectively variable points along the lengths of the latter.

7. In an implement attachment for a tractor having a power actuator lifting device, the combination of a sub-frame including a pair of beams adapted to be rigidly fixed to the rear axle housing of the tractor and projecting forwardly on opposite sides of the tractor body, a pair of pusher bars having plow disks on their forward ends, means for connecting the rear end portions of said bars to the rear of the tractor with the bars extending forwardly and outwardly away from each other in a V, means for suspending said bars from the lift device on opposite sides of the tractor, said bars having uprights thereon each presenting a series of ratchet teeth and projecting upward adjacent said beams, a pair of pawls pivoted on respective ones of said beams for engagement with the teeth on corresponding ones of said uprights upon elevation of the latter by raising of the bars by the lift device, an operating shaft extending transversely between said beams, a manual operating lever for oscillating said shaft, and means for actuating said pawls alternatively into and out of position for operative engagement with the teeth on their corresponding uprights in response to oscillation of said shaft in corresponding opposite directions.

8. In a two-way plow attachment for a tractor having a power operated lift device thereon equipped with a reversing control member movable between respective lifting and lowering positions and having means yieldably urging said control member toward its lowering position, the combination of a pair of pusher bars having disks on their forward ends canted with respect to the longitudinal axes of their respective bars, thrust means engaging the rear ends of said bars and journaling the same for rotational adjustment about their longitudinal axes and with the bars positioned to extend forwardly and outwardly away from each other in a V, means for rotatively adjusting said bars individually about their respective axes to change the angle of entry into the ground of the canted disks thereon, a generally upright link adapted to be pivoted intermediate its ends on the rear end of the tractor with its upper end adjacent said control member, means for connecting the upper end of said link to said control member for shifting of the latter toward its lifting position against the yielding bias of said urging means upon forward swing of said upper end of said link and means for mounting said thrust means pivotally on the lower end of said link for individual vertical swinging motion of said pusher bars into and out of ground-engaging position for their disks, whereby the reaction thrust of the ground against either disk and its pusher bar which is lowered into ground-engaging position tends to swing said link in a direction to move the latter's upper end forwardly.

9. In a two-way plow attachment for a tractor having a power operated lift device thereon equipped with a reversing control member movable between respective lifting and lowering positions and having means yieldably urging such control member toward its lowering position, the combination of a pair of pusher bars disposed generally side-by-side and each carrying ground-engaging means, a generally upright link adapted to be pivoted intermediate its ends on the rear end of the tractor with its upper end adjacent the control member, means for connecting the upper end of said link to said control member for shifting of the latter toward its lifting position against the yielding bias of said urging means upon forward swing of the upper end of said link, means for supporting the rear ends of said bars on the lower end of said link for independent vertical swinging motion of said bars to raise and lower the ground-engaging means carried thereby, whereby the reaction thrust of the ground against either of said ground-engaging means and its pusher bar serves to swing said link in a direction to move the latter's upper end forwardly, and means for suspending said bars from the lift device on the tractor for vertical movement thereby.

10. In an attachment for a tractor having a power actuated lift device thereon including a member reversely movable in respective opposite directions for raising and lowering operations, the combination of a pair of independently elevatable elements, means for freely suspending both of said elements with such suspension means in positive driving engagement with the same movable member of said lifting device for simultaneous tensioning and slacking-off of such suspension means, such free suspension causing either of said elements to rise as said member is moved in a raising direction with an element hanging therefrom but also permitting said member to move in a lowering direction with reference to either of the elements when such element is positively held against descent, and latch means operable only when said lift device is raised to engage only alternative ones of said elements to retain the same in elevated position upon subsequent lowering movement of said lift device.

11. In an attachment for a tractor having a power actuated lift device thereon including a member reversely movable in respective opposite directions for raising and lowering operations, the combination of a pair of independently elevatable elements, means for freely suspending both of said elements with such suspension means in positive driving engagement with the same movable member of said lifting device for simultaneously tensioning and slacking-off such suspension means, such free suspension causing either of said elements to rise when said member is moved in a raising direction with an element hanging therefrom but also permitting said member to move in a lowering direction with reference to either of the elements when such element is positively held against descent, and manually operable latch means presettable for selective automatic alternative engagement with one or the other of said elements upon elevation of the same by said lift device.

12. In a two-way plow attachment for a tractor having a power actuated lift device thereon including a member reversely movable in respective opposite directions for raising and lowering operations, the combination of a pair of plows having respective independently elevatable supports, means for movably connecting said supports to the tractor, means for freely suspending both of said supports with such suspension means in positive driving engagement with the same movable member of said lifting device for simultaneous tensioning and slacking-off of such suspension means, such free suspension causing either of said supports to rise when said member is moved in a raising direction with a support hanging therefrom but also permitting said member to move in a lowering direction with reference to either of said supports when such support is positively held against descent, and manually operable latch means manipulable from the tractor for alternative automatic engagement with one or the other of said supports upon elevation of the same by said lift device.

JOHN W. ING.

REFERENCES CITED

The following references are of record in the file of this patent:

UNITED STATES PATENTS

| Number | Name | Date |
|---|---|---|
| 1,074,115 | Hackney | Sept. 30, 1913 |
| 2,295,898 | Hollis | Sept. 15, 1942 |
| 1,262,304 | Carpenter | Apr. 9, 1918 |
| 2,156,569 | Lindgren et al | May 2, 1939 |
| 2,336,062 | Brown et al. | Dec. 7, 1943 |
| 1,603,993 | Stark | Oct. 19, 1926 |
| 2,249,861 | Silver | July 22, 1941 |